United States Patent [19]
Lombardi et al.

[11] Patent Number: 5,557,838
[45] Date of Patent: Sep. 24, 1996

[54] METHODS FOR WINDING ARMATURES HAVING SLOT COMMUTATORS

[75] Inventors: Massimo Lombardi; Sabatino Luciani; Massimo Ponzio; Graziano Quirini, all of Florence, Italy

[73] Assignee: Axis USA, Inc., Marlborough, Mass.

[21] Appl. No.: 286,516

[22] Filed: Aug. 5, 1994

Related U.S. Application Data

[62] Division of Ser. No. 909,577, Jul. 6, 1992, Pat. No. 5,369,877.

[51] Int. Cl.[6] .................................................. H02K 15/09
[52] U.S. Cl. .................................................. 29/597; 29/598
[58] Field of Search ........................ 29/597, 598, 733, 29/735, 736

[56] References Cited

U.S. PATENT DOCUMENTS

| | | |
|---|---|---|
| 2,949,554 | 8/1960 | Biddison .................................. 310/206 |
| 3,395,449 | 8/1968 | Moore ...................................... 29/596 |
| 3,513,528 | 5/1970 | Nussbaumer . |
| 3,818,570 | 6/1974 | Del Bono . |
| 3,911,563 | 10/1975 | Anderson .................................. 29/597 |
| 3,913,220 | 10/1975 | Miller ...................................... 29/597 |
| 4,541,170 | 9/1985 | Barrera .................................... 29/597 |

FOREIGN PATENT DOCUMENTS

| | | |
|---|---|---|
| 1214796 | 12/1970 | United Kingdom . |
| 2018168 | 10/1979 | United Kingdom . |

*Primary Examiner*—Carl E. Hall
*Attorney, Agent, or Firm*—Fish & Neave; Robert R. Jackson; G. Victor Treyz

[57] ABSTRACT

A wire winding machine is provided that allows the connection of electric motor armature coil leads to slot-type commutators. The machine uses rotations of a flyer and rotations of the armature to perform much of the needed movement during the lead attachment process. The system uses a guide member to guide the wire into the commutator slots during rotation of the flyer. The guide member guides wire from the flyer toward the slots during both the initial insertion of the wire and the subsequent process of forming a loop in the wire.

14 Claims, 20 Drawing Sheets

FIG. I 5,557,838

METHODS FOR WINDING ARMATURES HAVING SLOT COMMUTATORS

This is a division of application Ser. No. 07/909,577, filed Jul. 6, 1992, U.S. Pat. No. 5,369,877.

BACKGROUND OF THE INVENTION

This invention relates to winding electric motor armatures, and particularly to connecting armature coil leads to commutator slots.

The process of manufacturing an electric motor armature involves several wire winding steps, including coiling wire around the armature core and connecting the coil leads to commutator tangs or slots. Although it is often acceptable to terminate the leads using commutators having tangs, it is sometimes necessary, for instance when using heavy-gauge wire, to use commutators that employ slot-type terminations. After each armature core slot is wound, the leads are secured in corresponding commutator slots. When the armature has been completely wound, the wire in the commutator slots is subjected to a fusing operation, which vaporizes the insulation from the wire and creates a mechanically and electrically stable connection between the wire and the slot.

Prior to fusing, the leads may be secured by using commutator slots that are narrower than the wire diameter, which allows the leads to be press-fit into the slots. Alternatively, lead connections may be formed with commutators that have larger slots. In order to hold a lead in a slot of the larger type, a peening tool is used to deform a portion of the center of the slot sidewalls onto the top of the wire. In either case, following initial insertion the wire is looped back on top of itself and further secured.

One drawback of previously known winding machines is that they have incorporated dedicated mechanisms to perform the additional steps associated with forming the wire loop, compacting and securing the wire. These mechanisms have tended to add significantly to the complexity of such systems, slowing their operation and reducing throughput.

SUMMARY OF THE INVENTION

It is therefore an object of the present invention to provide a method and apparatus for winding electric motor armatures.

It is a further object of the invention to provide a simplified method and apparatus that allows increased throughput when winding armatures that have slot-type commutator connections.

These and other objects of the invention are accomplished in accordance with the invention by providing an improved winding machine. The present machine allows the wire to be manipulated primarily through motions of the winding machine flyer and rotations of the armature, which allows faster operation of the winder and increased system throughput. The machine incorporates a guide for intersecting the path of the wire as it is fed from the flyer. The guide may be aligned with the commutator slot, so that as the flyer rotates, the wire is directed toward the slot. After the wire has been inserted in the slot, the armature is rotated. This rotation in combination with the motion of various members of the winding machine further inserts the wire into the slot and draws the wire toward the armature shaft and the face of the commutator, thus placing the wire in a secure position.

Further features of the invention, its nature and various advantages will be more apparent from the following detailed description of the preferred embodiments and the accompanying drawings.

DETAILED DESCRIPTION OF THE PREFERRED EMBODIMENTS

During the electric motor armature manufacturing process, wire is typically wound onto the armature core with a rotating flyer. After each core slot is filled, a connection must be made to the commutator. In order to maintain system throughput as high as possible, it is important that the step of connecting the coil leads to the commutator does not slow the winding process appreciably. However, in practice some previously known armature winding machines have incorporated pneumatically-driven mechanisms for attaching the leads to the commutator slots. Such additional hardware has had a deleterious effect on winding machine performance. In armature winding machines constructed in accordance with the present invention, performance is enhanced by efficiently using motions of the winding machine flyer and rotations of the armature to perform operations during lead attachment that have previously required slower hardware.

Figure 1:
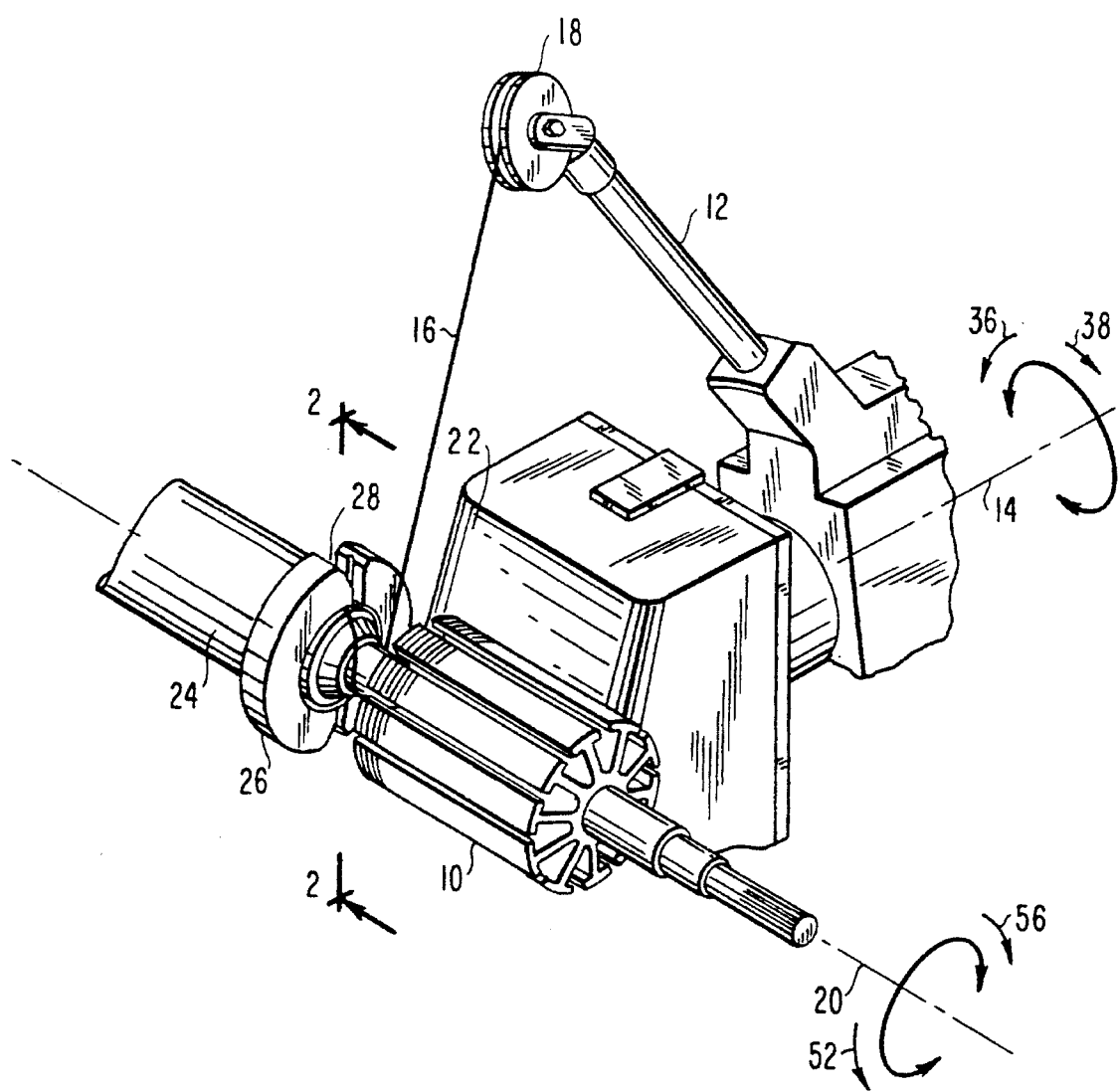
FIG. 1 is a perspective view of an illustrative embodiment of a wire winding machine constructed according to this invention.

A first illustrative embodiment of a wire winding machine constructed in accordance with the present invention is shown in FIG. 1. When winding the core slots of armature 10, flyer 12 rotates around axis 14, while dispensing wire 16 via pulley wheel 18. In practice, two identical flyers are used simultaneously, although for the purposes of this description, reference will only be made to the operation of flyer 12. The duplicate elements for use with the second flyer are generally still present in the drawings.

Figure 2:
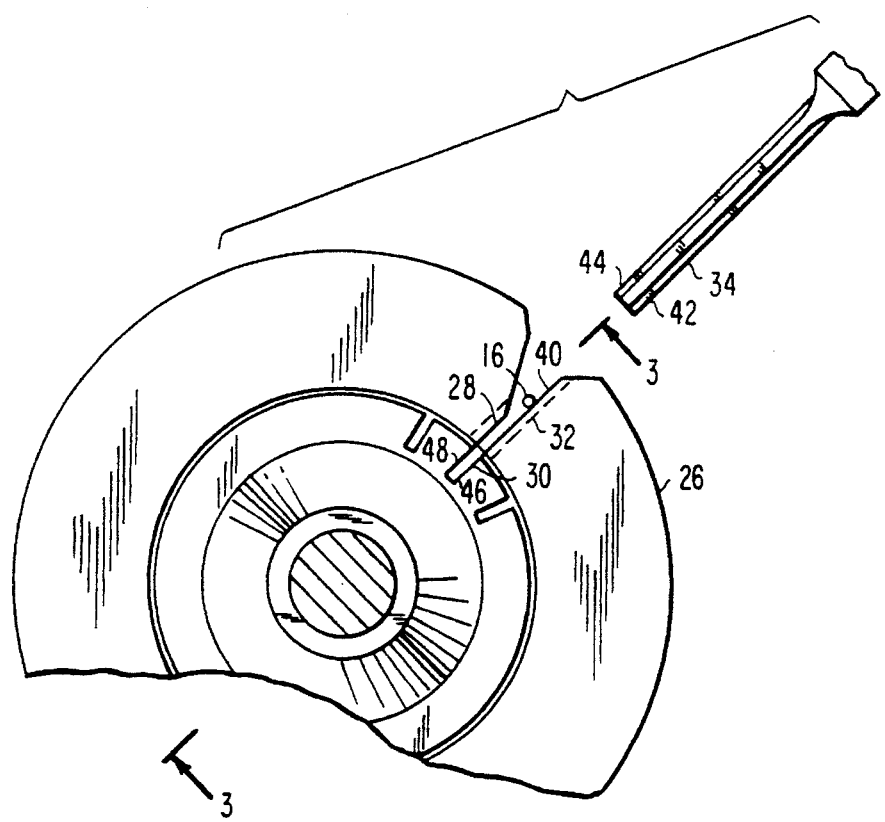
FIG. 2 is a cross-sectional view taken along the line 2—2 in FIG. 1 showing wire capture by the notch.

The shaft of armature 10 is supported by a collet tube arrangement that is driven by a conventional drive unit (not shown). During operation, armature 10 is incrementally rotated around axis 20 so that each of the core slots of armature 10 may be filled. Wire guide 22 aligns wire 16 with the core slots during winding. After a core slot has been completely wound, tube 24 and circular guide ring 26, which is mounted on tube 24, are rotated so that notch 28 intersects the path of wire 16. Armature 10 is also positioned for wire insertion so that, as shown in FIG. 2, commutator slot 30 aligns with notch 28. Notch 28 has portions that define passageway 32, which allows peening tool 34 to reciprocate freely.

Figure 4:
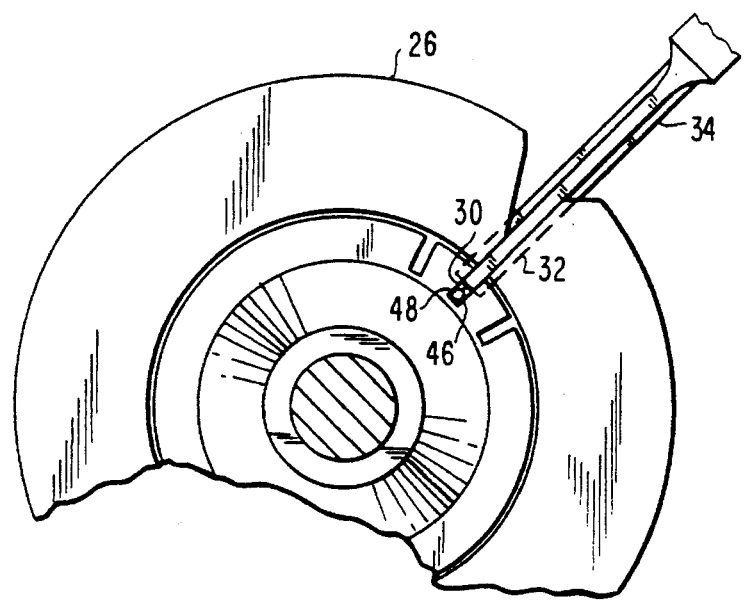
FIG. 4 is a view taken along the line 4—4 in FIG. 3, which shows the insertion of the peening tool into the slot.
Figure 3:
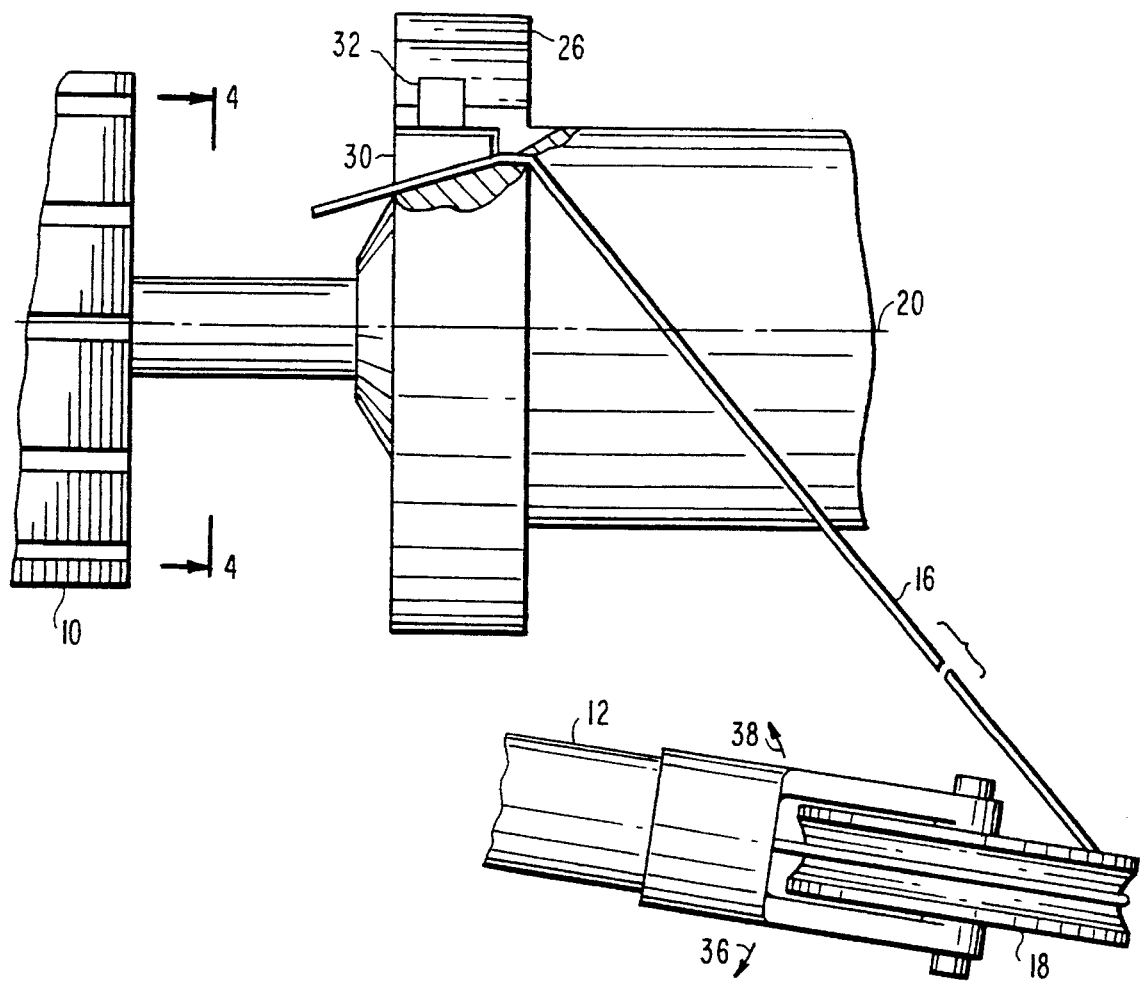
FIG. 3 is a view, partially in section, taken along the line 3—3 in FIG. 2 showing the position of the wire after it has been inserted into the commutator slot.
Figure 5:
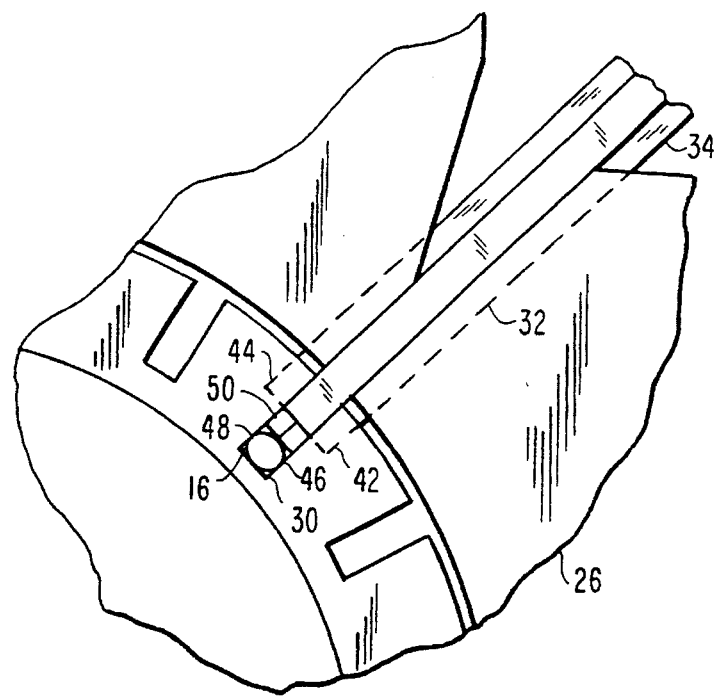
FIG. 5 is a view showing the use of a peening tool with the illustrative winding machine of FIG. 1.
Figure 6:
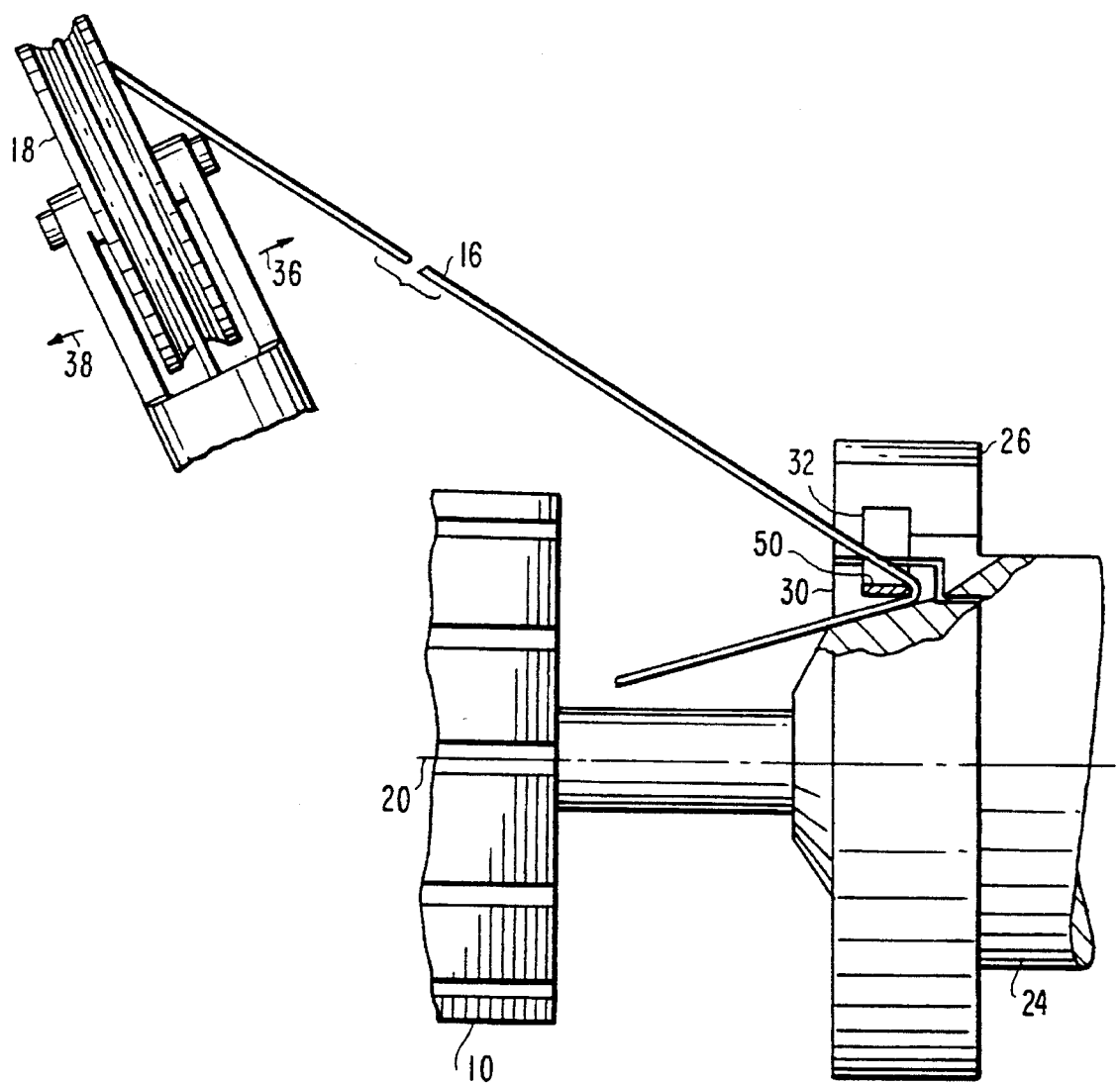
FIG. 6 is a view, partially in section, of the illustrative winding machine of FIG. 1 during the process of forming a wire loop by rotation of the flyer.

Flyer 12, which may be rotated in either direction 36 or direction 38, causes wire 16 to engage sidewall 40 of notch 28 after sufficient rotation in direction 36. Referring to FIG. 3, further rotation of flyer 12 pulls wire 16 to the bottom of commutator slot 30. At this point peening tool 34 is driven into commutator slot 30, as shown in FIGS. 4 and 5. Because edges 42 and 44 of peening tool 34 are farther apart than edges 46 and 48 of commutator slot 30, the insertion of peening tool 34 deforms edges 46 and 48 of commutator slot 30, thereby holding wire 16 in place at the peening point with deformed metal 50. Following the formation of deformed metal 50, flyer 12 is rotated in direction 38 to the position shown in FIG. 6. Because the path of wire 16 continues to be intersected by sidewalls of notch 28, wire 16 is again guided into slot 30, thus forming a loop of wire 16.

Figure 7:
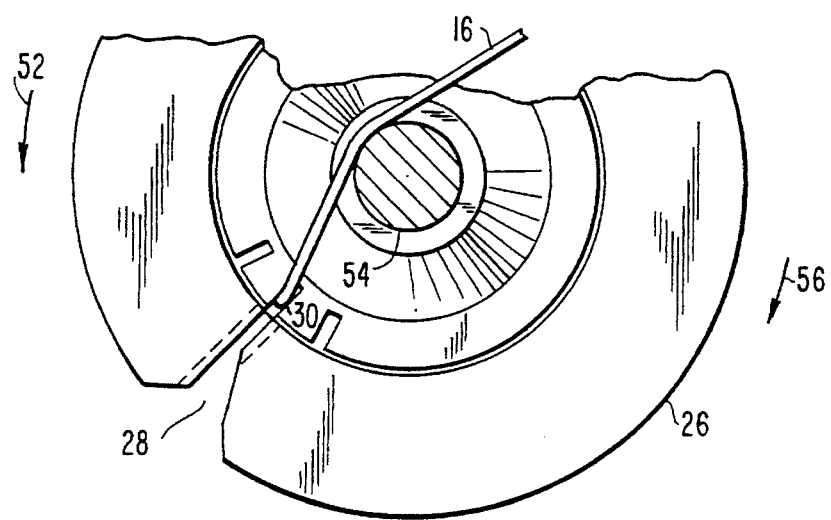
FIG. 7 is a cross-sectional view showing the wire position following armature rotation in accordance with the illustrative winding machine of FIG. 1.
Figure 8:
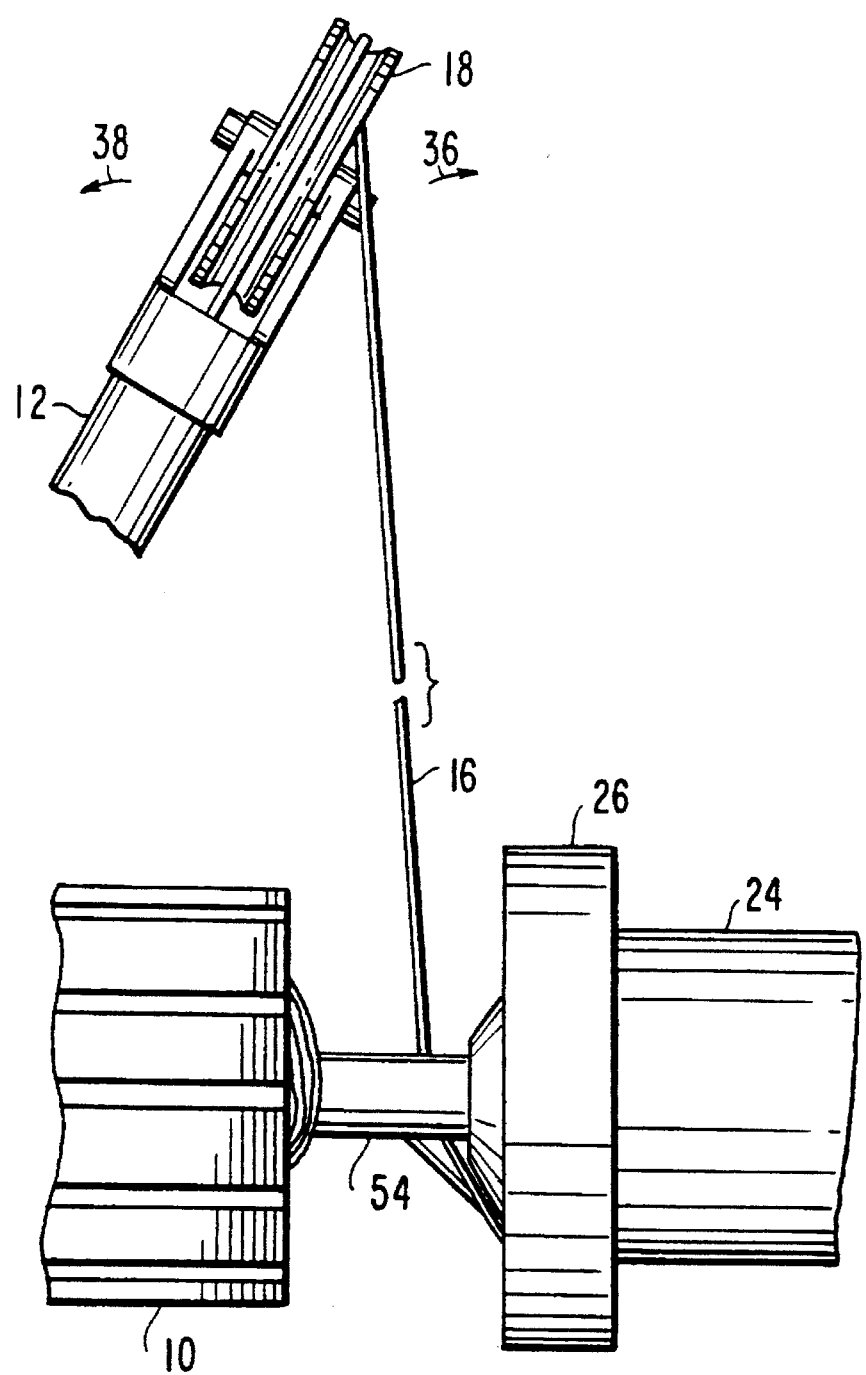
FIG. 8 is a view of the illustrative winding machine of FIG. 1 further showing the wire position, as in FIG. 7, following armature rotation.

In order to further compact wire 16 into commutator slot 30, armature 10 is rotated in direction 52 to the position shown in FIGS. 7 and 8. The resulting loop of wire 16 around deformed metal 50 is entirely within commutator slot 30, which obviates the need for further processing to remove extensions of the leads, which might protrude from commutator slot 30. In this position, wire 16 has been drawn toward the endface of the commutator and toward shaft 54 of armature 10. Typically, wire 16 will rest on top of previously wound leads. Although previous winding machines may have also allowed rotation of the armature at this point, these rotations were typically less extensive and served only to align the core slots for subsequent winding.

Figure 9:
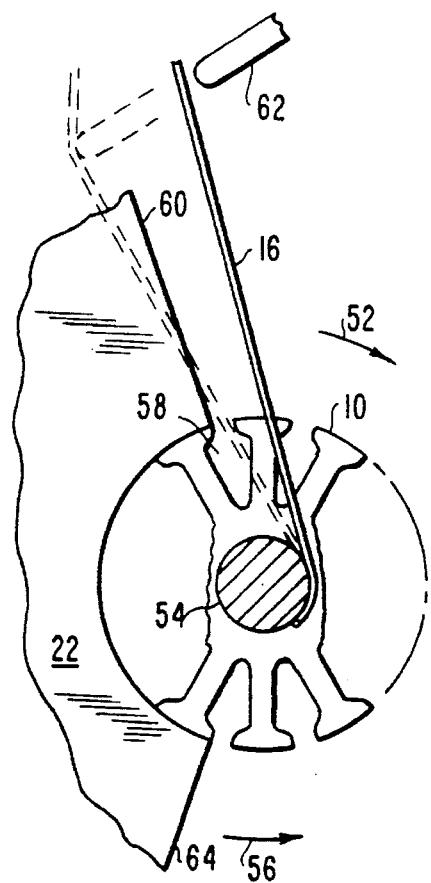
FIG. 9 is a cross-sectional view of the illustrative winding machine of FIG. 1 showing the use of a deflector to properly position the wire prior to winding an armature core.
Figure 10:
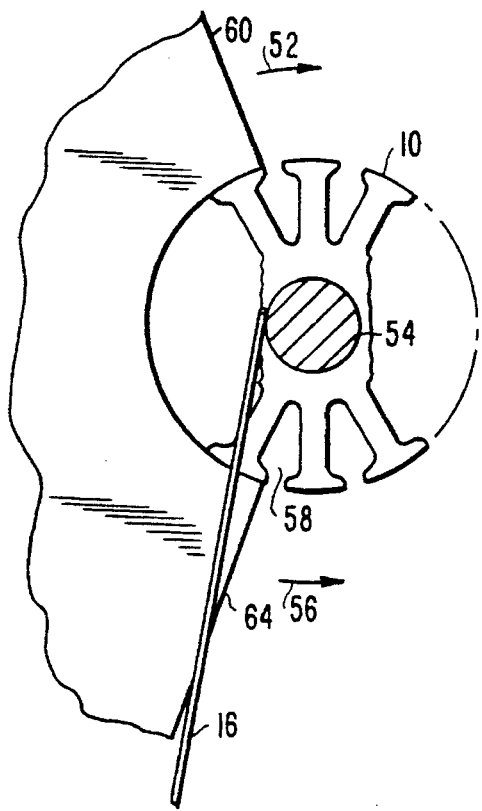
FIG. 10 is a view, similar to that in FIG. 9, where the armature has been rotated to properly position the wire for core-winding without using the deflector.
Figure 11:
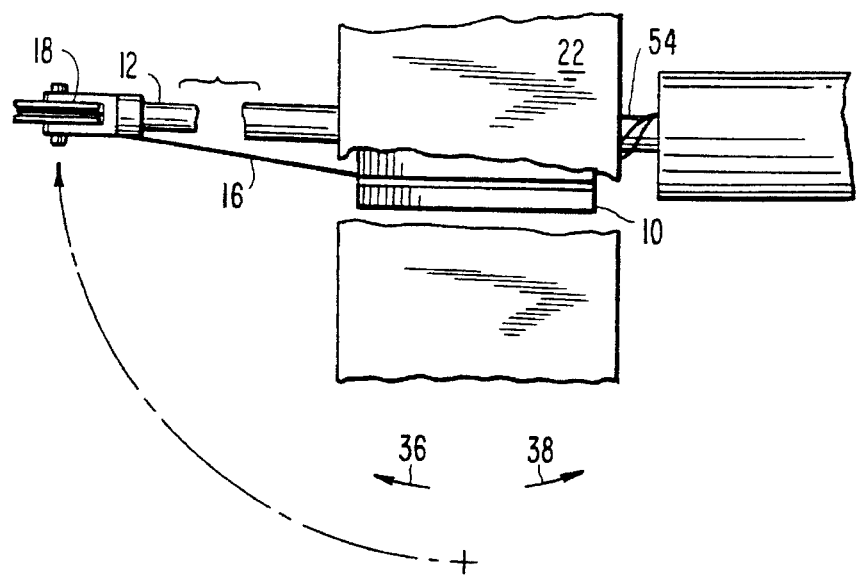
FIG. 11 is a view, partially in section, of the illustrative winding machine of FIG. 1 where the wire has been inserted into a core slot by rotating the flyer, following the positioning of the armature as shown in FIG. 10.
Figure 12:
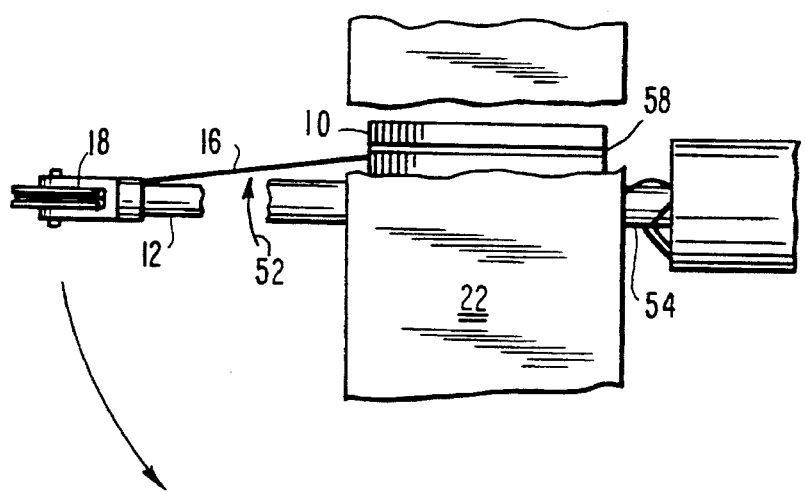
FIG. 12 is a view, partially in section, of the illustrative winding machine of FIG. 1 during core winding.

Before winding the next core slot of armature 10, ring 26 may be rotated slightly in either direction 52 or direction 56, so as to cover commutator slot 30 and thereby further secure wire 16. However, due to various factors such as the diameter of shaft 54, the size of the core slots, and the desired winding scheme, the path of wire 10 may not initially be properly aligned for winding the next slot. For example, as shown in FIG. 9, the unassisted rotation of flyer 12 in direction 38 will not wind wire 16 into core slot 58 as desired, since the path of wire 16 does not intersect surface 60 of wire guide 22. Deflector 62 could be used to position wire 16 correctly, but would add unnecessary complexity to the winding apparatus. Rather, it is preferable that armature 10 be rotated to the position shown in FIG. 10, where core slot 58 is aligned with surface 64 of wire guide 22. Because the path of wire 16 is now intersected by wire guide 22, following this alignment flyer 12 may be rotated in direction 36 until reaching the position shown in FIG. 11, thus placing wire 16 into core slot 58. After rotating armature 10 in direction 52 to align core slot 58 with surface 60 of wire guide 22, as shown in FIG. 12, flyer 12 may be rotated continuously in direction 38 until core slot 58 and the core slot aligned with surface 64 are completely wound and the next commutator connection must be made. Although this method of preparing armature 10 for core winding after a commutator connection has been made has been described in connection with a single illustrative embodiment of the present invention, the method is more general, and may be used with any apparatus for forming lead connections to commutator slots that is in accordance with the invention.

Figure 13:
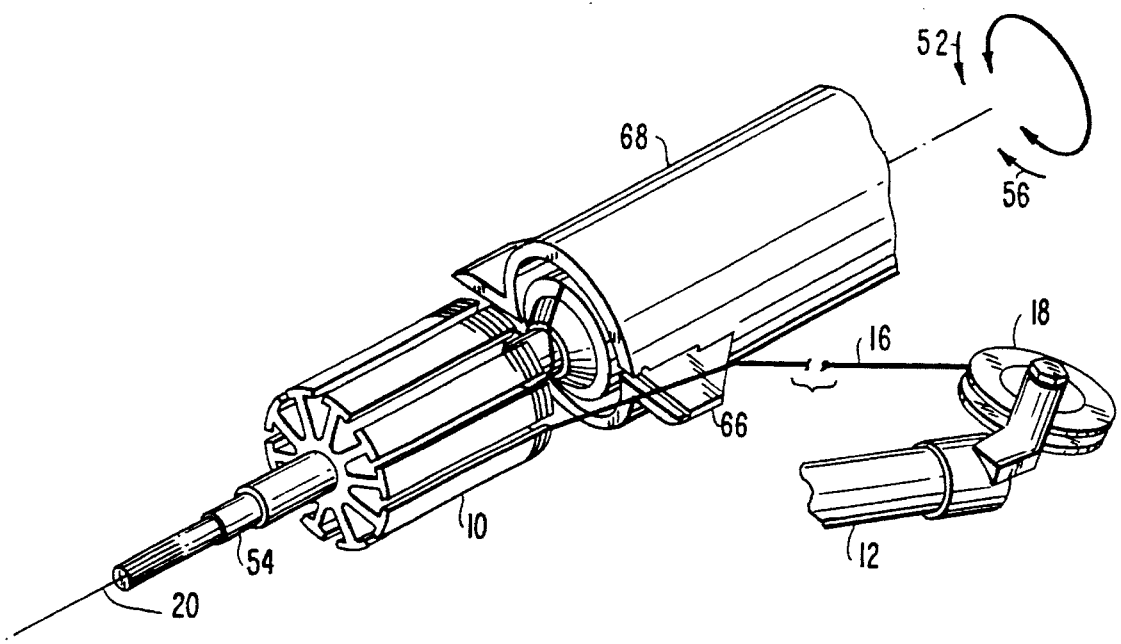
FIG. 13 is a perspective view of an additional illustrative embodiment of a wire winding machine constructed according to this invention.
Figure 14:
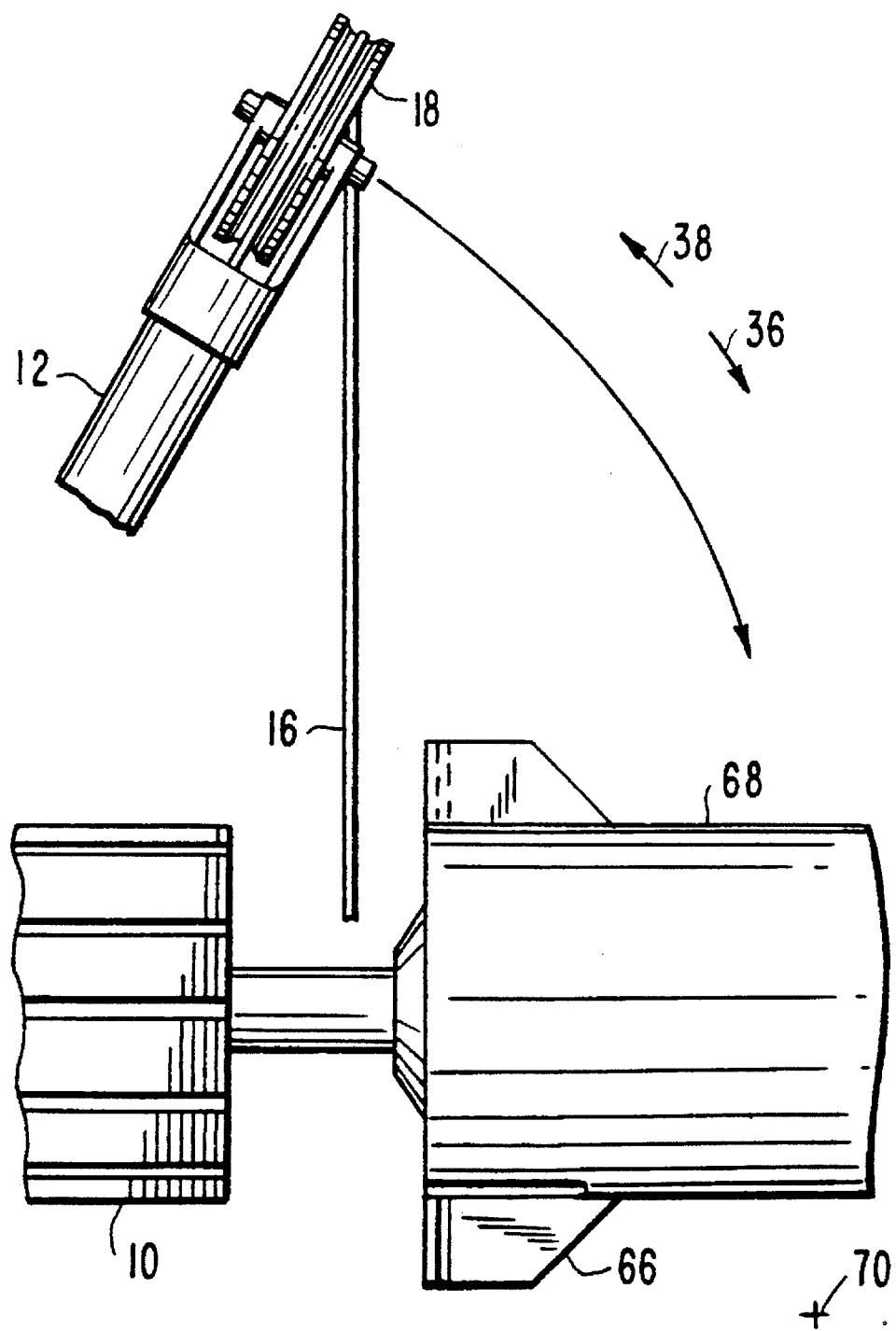
FIG. 14 is a view of the illustrative embodiment of the winding machine in FIG. 13 prior to inserting the wire into the commutator slot.
Figure 15:
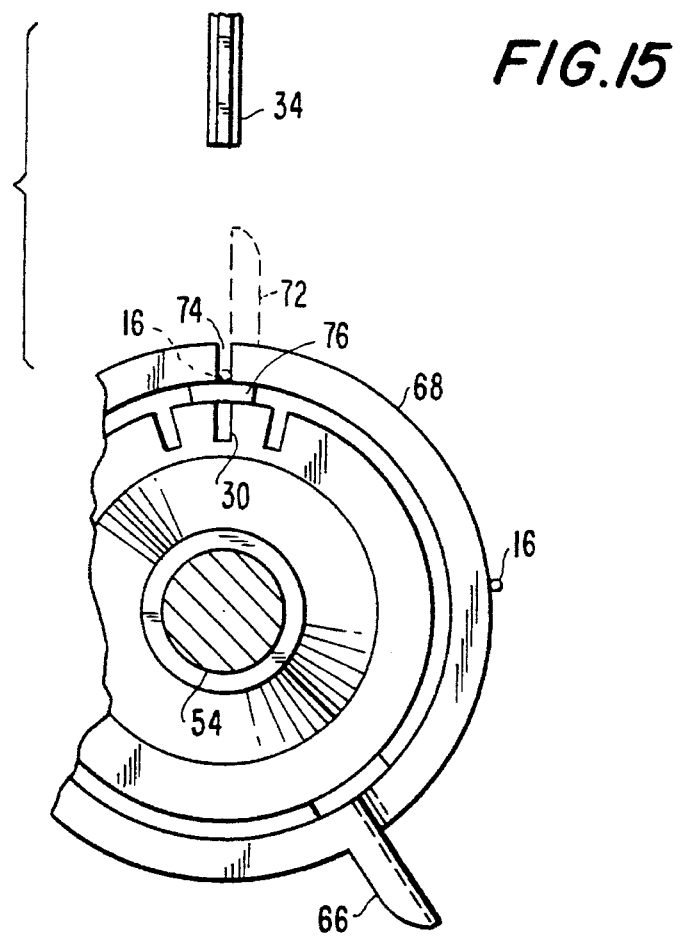
FIG. 15 is a cross sectional view of the illustrative embodiment of the winding machine of FIG. 13 showing the alignment of the wire with the commutator slot.
Figure 16:
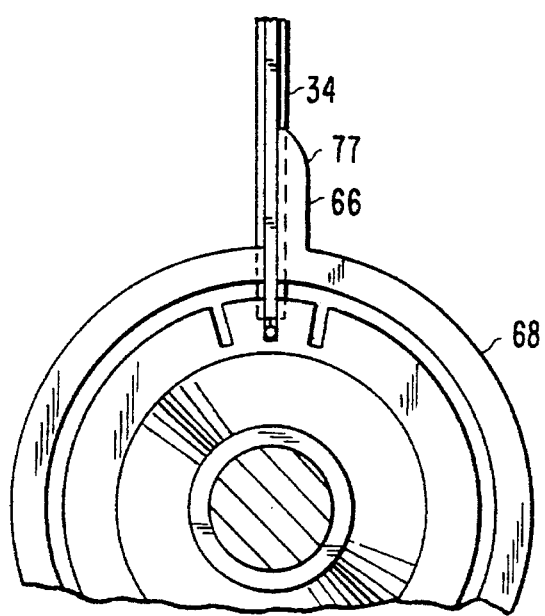
FIG. 16 is a view of the illustrative embodiment of the winding machine of FIG. 13 during the use of the peening tool.
Figure 17:
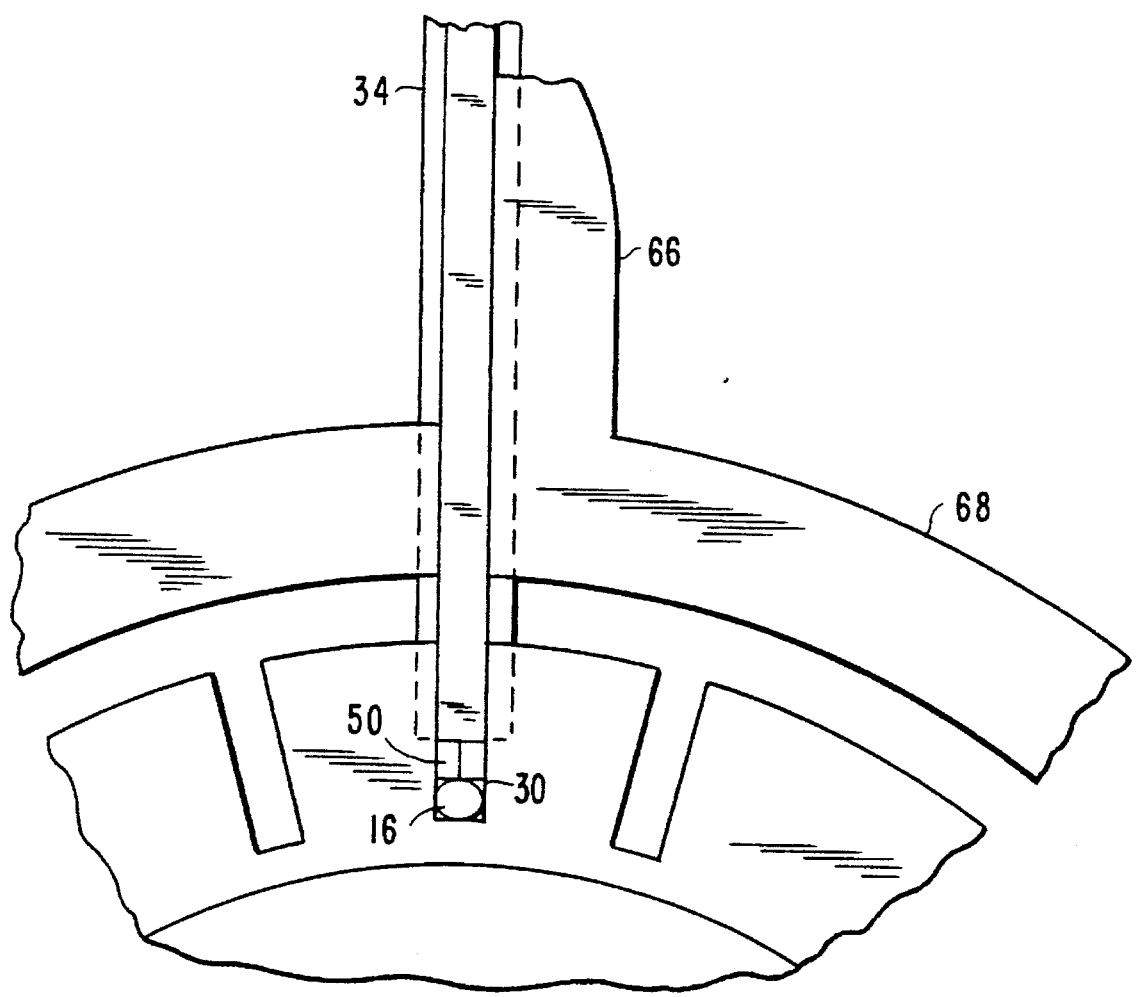
FIG. 17 is a view similar to that of FIG. 16, showing the region of the commutator slot in greater detail.

A second illustrative embodiment of a wire winding machine constructed in accordance with the present invention is shown in FIG. 13. Fin 66 is mounted on rotatable tube 68 for guiding wire 16 into commuter slot 30. Referring to FIGS. 14 and 15, after the winding of a core slot of armature 10 has been completed, flyer 12 is rotated in direction 36 to position 70, so that wire 16 contacts tube 68. Fin 66 is then rotated to position 72, which causes wire 16 to enter entrance 74. Wire 16 is allowed to enter commutator slot 30 by rotating gate 76 to the side. Similarly, a gate could also be provided that reciprocates along axis 20, with the same result. Fin 66 has a groove which allows peening tool 34 to reciprocate freely so that peening tool 34 may be driven into commutator slot 30 to form deformed metal 50 at the peening point as shown in FIGS. 16 and 17.

Figure 18:
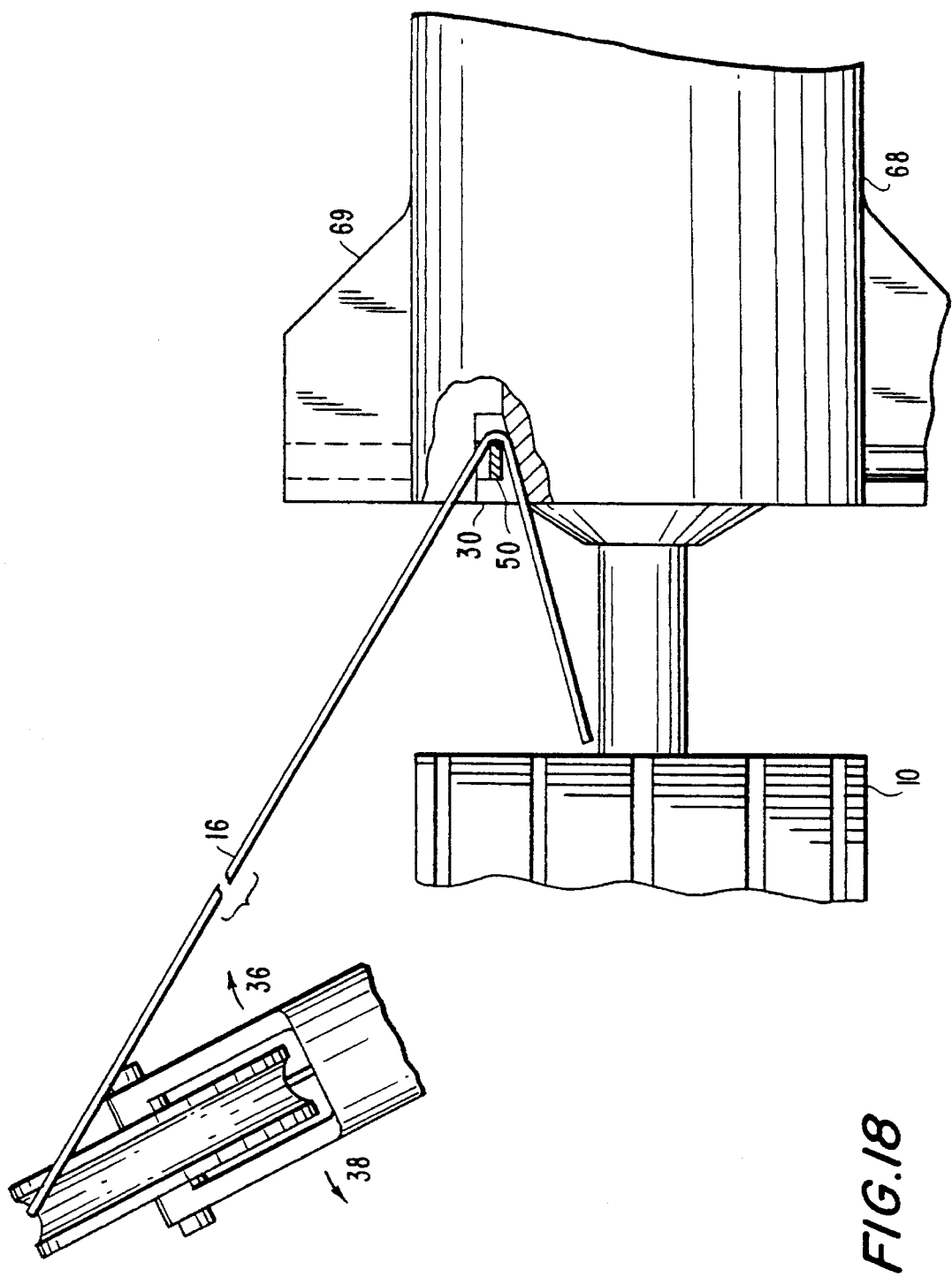
FIG. 18 is a view, partially in section, of the illustrative embodiment of the winding machine of FIG. 13 showing rotation of the flyer to form the wire loop.
Figure 19:
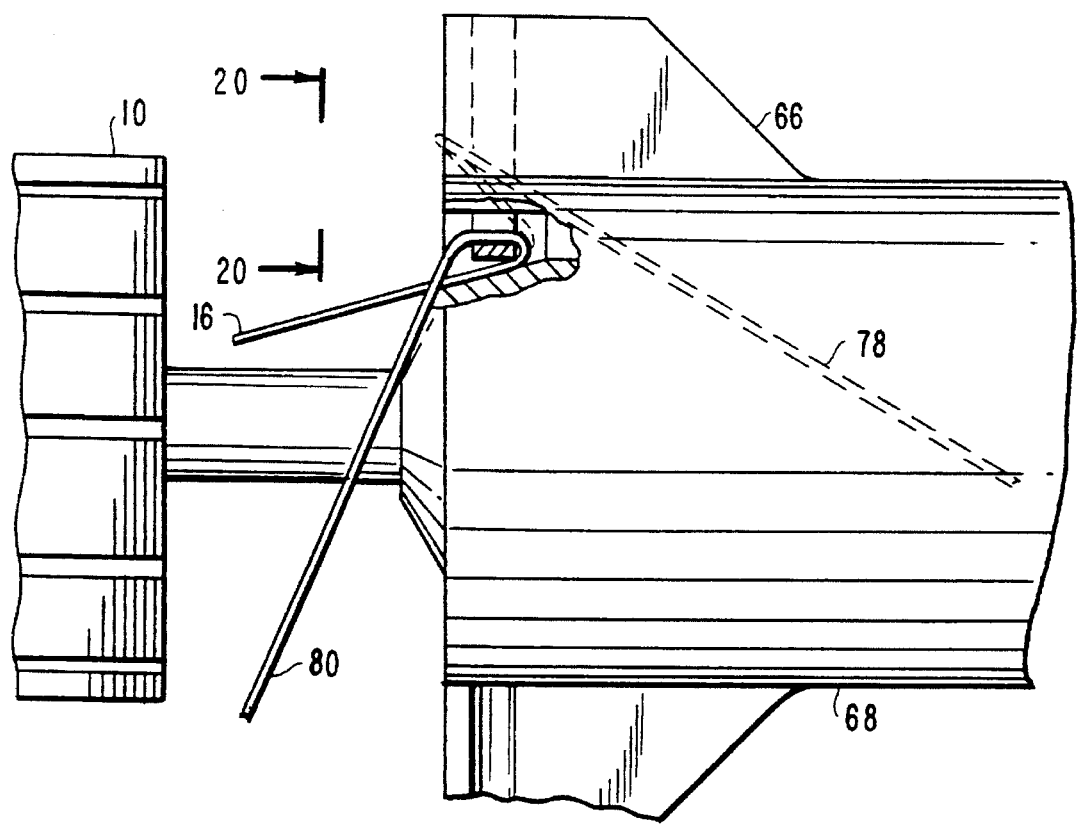
FIG. 19 is a view similar to that of FIG. 18 showing the effect of further flyer rotation.
Figure 20:
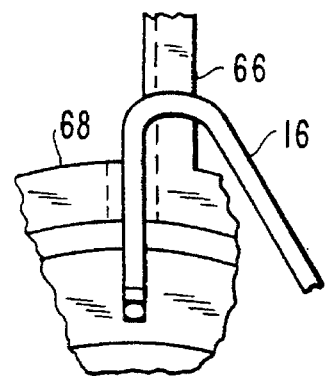
FIG. 20 is a view, taken along the line 20—20 in FIG. 19, showing the placement of the wire relative to the fin when the wire is in the position indicated by the dashed lines in FIG. 19.
Figure 21:
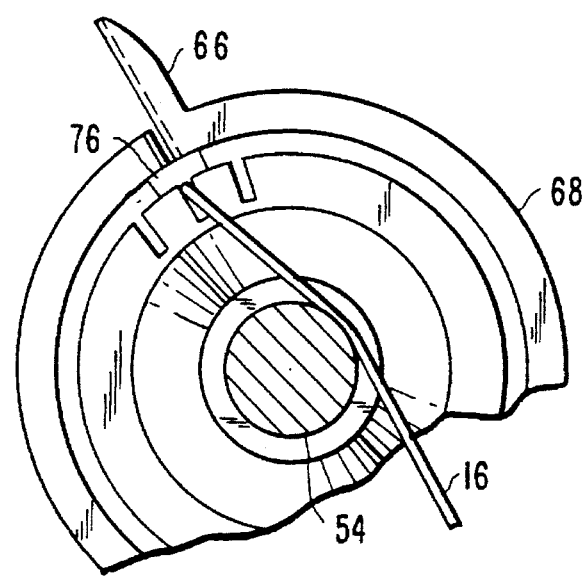
FIG. 21 is a view of the illustrative embodiment of the winding machine of FIG. 13 showing the position of the wire after rotation of the armature.

To form a compact wire loop within commutator slot 30 and to position wire 16 correctly for winding the next core slot, flyer 12 is then rotated in direction 38 to the position shown in FIG. 18. When flyer 12 is counterrotated in direction 36, wire 16 is deflected by curved upper surface 77 of fin 66 (shown in FIG. 16). Further rotation of flyer 12 causes wire 16 to advance from position 78 to position 80, creating a wire loop that is entirely within commutator slot 30, as shown in FIG. 19. The placement of wire 16 relative to fin 66 when wire 16 is in position 78 is shown in greater detail in FIG. 20. As shown in FIG. 21, before proceeding with the winding of the next core slot, gate 76 may be rotated to cover commutator slot 30, which maintains wire 16 in a compact loop. The movement of gate 76 may also aid in forming and compacting the loop of wire 16. Armature 10 is rotated to correctly position wire 16 prior to subsequent core winding steps, which proceed as previously described.

Figure 22:
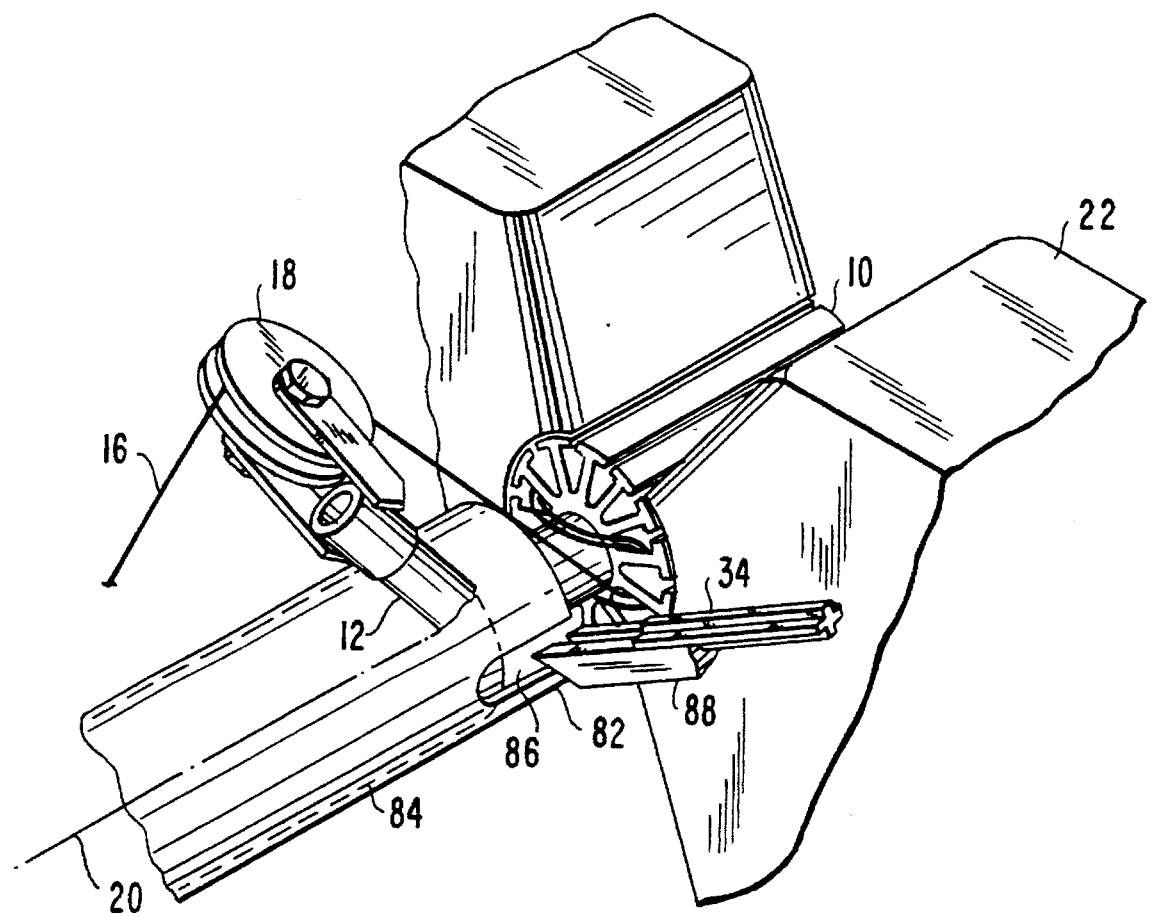
FIG. 22 is a perspective view of a further illustrative embodiment of a wire winding machine constructed according to this invention.

A third illustrative embodiment of a wire winding machine constructed in accordance with the invention is shown in FIG. 22. The commutator slots of armature 10 are covered by outer tube 82, which is rotatable around axis 20. Inner tube 84 is reciprocable along axis 20 so that opening 86 of inner tube 84 may be covered during core winding. After a core has been wound, armature 10 is rotated to align the commutator slot to which the coil lead is to be attached with opening 86.

Figure 23:
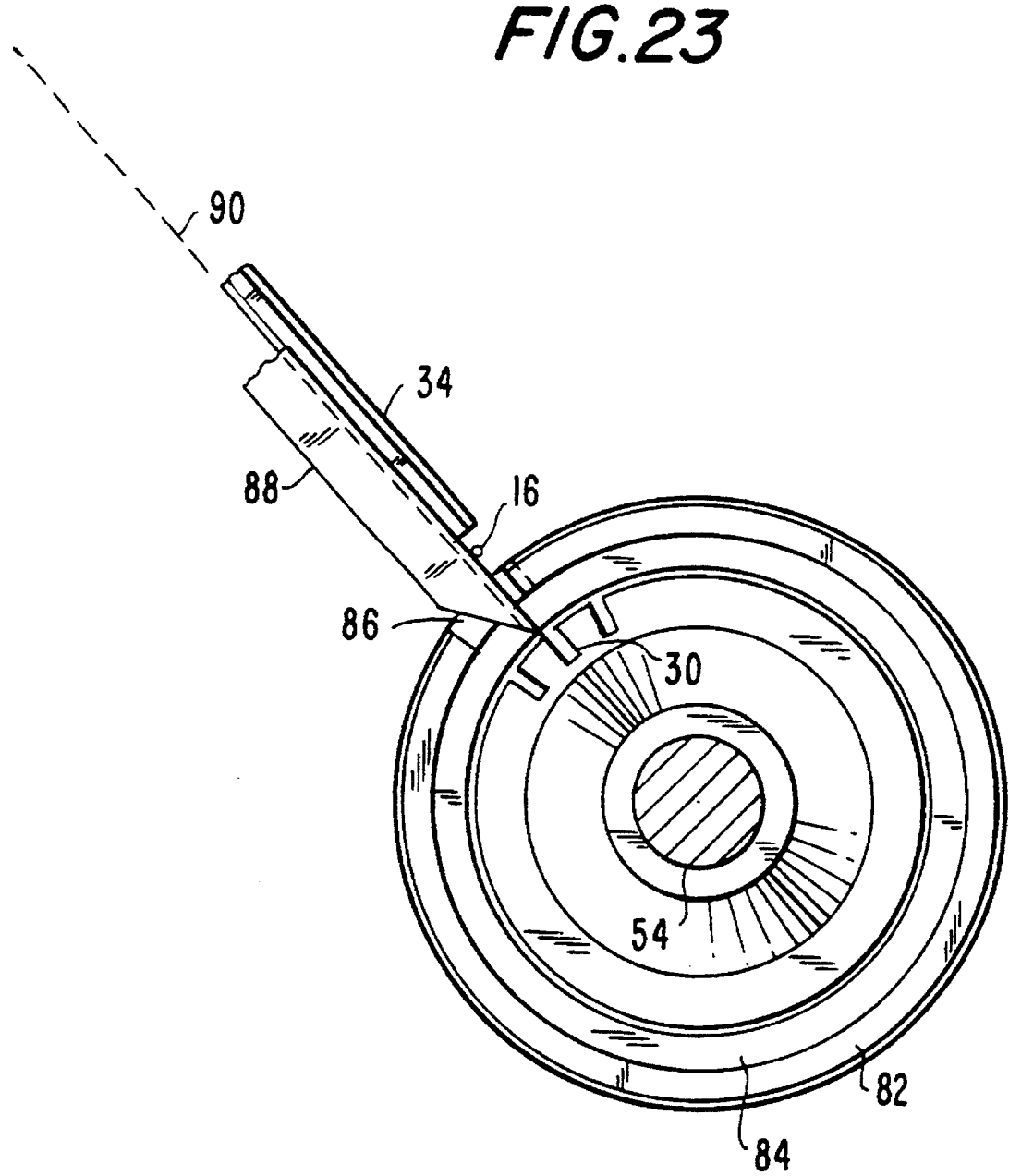
FIG. 23 is a cross-sectional view of the illustrative embodiment of the winding machine of FIG. 22 showing alignment of the wire with the commutator slot prior to insertion.

As shown in FIG. 23, guide shelf 88 is advanced into the path of wire 16 along axis 90. The tip of guide shelf 88 is placed just inside the entrance of commutator slot 30, so that wire 16 is guided into commutator slot 30 as flyer 12 advances.

Figure 24:
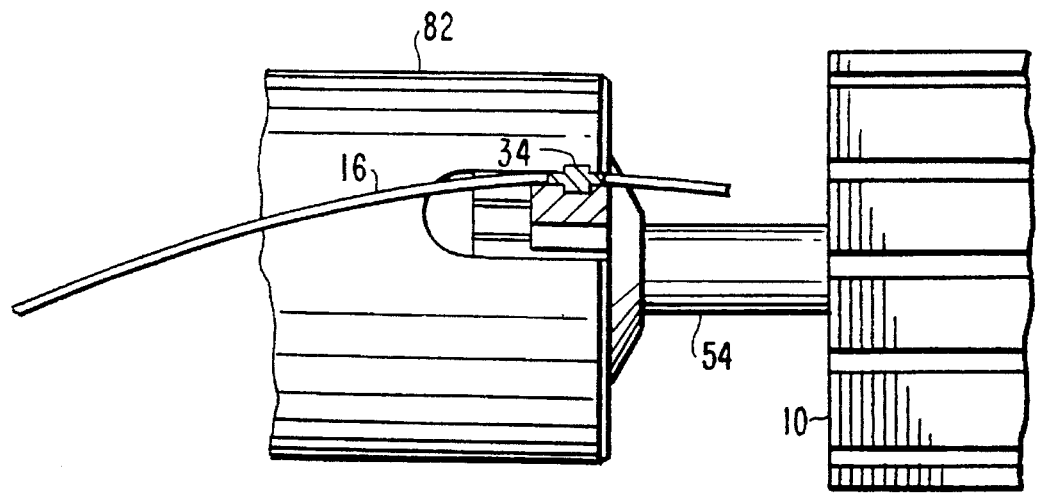
FIG. 24 is a view, partially in section, of the illustrative embodiment of the winding machine of FIG. 22 during wire insertion.
Figure 25:
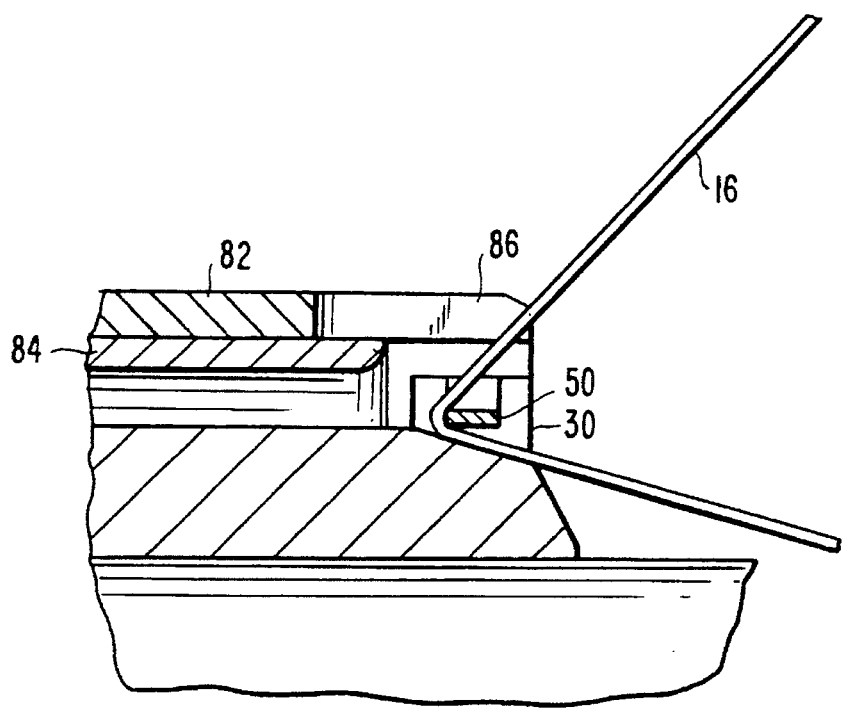
FIG. 25 is a cross-sectional view of the illustrative embodiment of FIG. 22 showing the position of the wire after peening.
Figure 26:
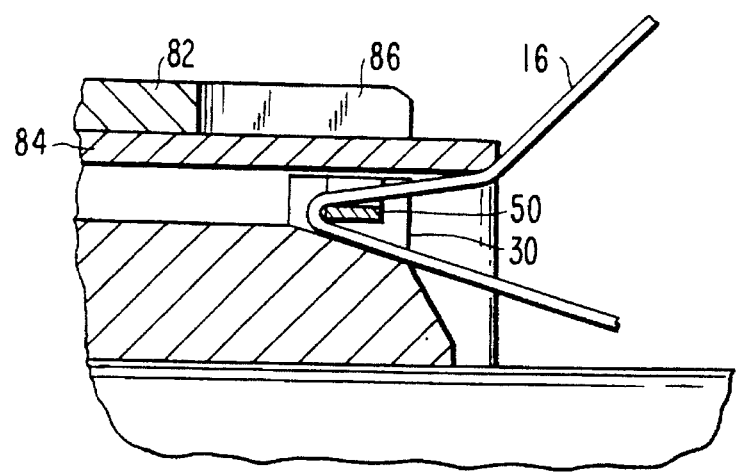
FIG. 26 is a view similar to that of FIG. 25 showing the wire position following movement of the inner tube.

Peening tool 34, which is reciprocally mounted in a groove on guide shelf 88, is driven along axis 90 into commutator slot 30, thereby creating deformed metal 50 on top of wire 16. The cross section of peening tool 34 is shown in FIG. 24. Following peening, flyer 12 is counterrotated. Since the path of wire 16 continues to be intersected by guide shelf 88 and the sidewall of opening 86, wire 16 is again guided into slot 30, thus looping wire 16 around deformed metal 50, as shown in FIG. 25. Inner tube 84 may then be moved forward, as shown in FIG. 26, thus aiding in the formation of a compact loop of wire 16. The movements of inner tube 84 also covers opening 86 and thereby prevents wire 16 from being dislodged from commutator slot 30 during subsequent movements of armature 10. As with the previously discussed embodiments, armature 10 is rotated prior to winding the next core slot so that this slot may be correctly aligned with wire guide 22 and so that wire 16 is correctly position with respect to the commutator face and shaft 54.

Figure 27:
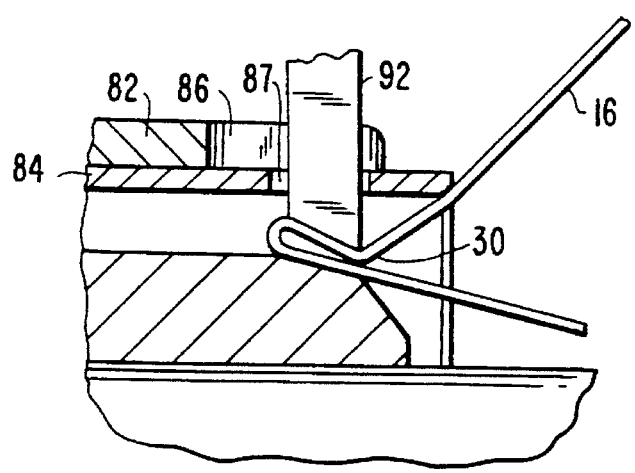
FIG. 27 is a view similar to that of FIG. 25 showing the wire position after movement of the inner tube where the commutator slots are of the narrow type.
Figure 28:
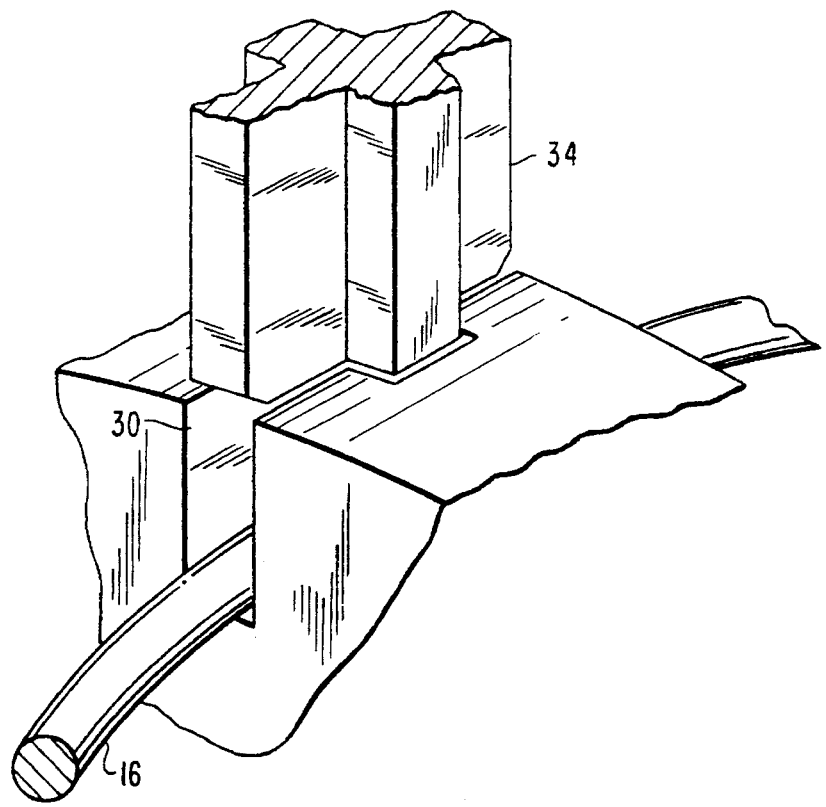
FIG. 28 is a perspective view of an illustrative embodiment of a peening tool just prior to insertion into a slot.
Figure 29:
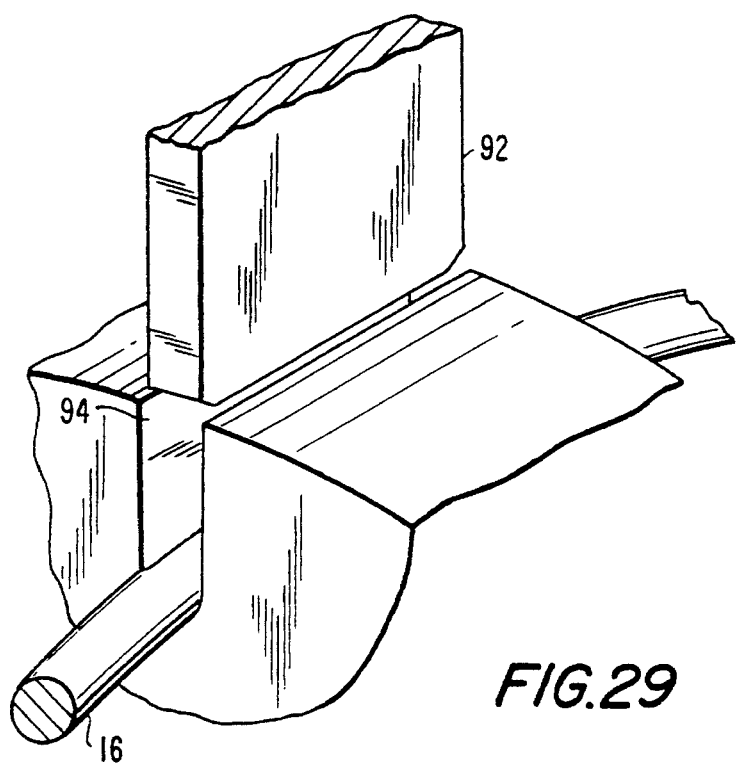
FIG. 29 is a perspective view of an illustrative embodiment of a blade for driving wire into commutator slots of the narrow type.

Shown in FIG. 27 is a perspective view of peening tool 34, just prior to insertion into slot 30. If peening tool 34 is replaced by a blade 92 that is adapted to fit within a commutator slot without deforming the slot sidewalls, as shown in FIG. 28, the aforementioned illustrative embodiments may also be used to connect coil leads to narrow slots, where the slot width is less than the diameter of the wire. In this case, after flyer 12 advances sufficiently and wire 16 is aligned with the appropriate commutator slot, blade 92 drives wire 16 into slot 94. Wire 16 deforms just sufficiently to fit into slot 94, and is held in place by this tight fit.

If the first illustrative embodiment of the winding machine is used to attach leads to narrow commutator slots, flyer 12 is then reversed so that wire 16 loops back on itself in alignment with slot 94. Since two flyers are used for winding simultaneously, two blades are provided. One advantage of this arrangement is that when armature 10 is rotated to compact the loop of wire 16, slot 94 may be brought into alignment with the second blade, which may then be used to complete the insertion of wire 16 into the slot.

If the second illustrative embodiment of the winding machine is used to attach leads to narrow commutator slots, following wire insertions with the first blade, flyer 12 may be rotated in direction 38 so that the wire is no longer engaged by the fin. Flyer 12 may then be rotated in direction 36 such that curved upper surface 77 of fin 66 deflects wire 16, which is drawn on top of commutator slot 30. Following this alignment, the first blade may be used to drive wire 16 into commutator slot 30 on top of the previously inserted wire.

If the third illustrative embodiment of the winding machine is used to attach leads to narrow commutator slots, after wire 16 is inserted with the first blade, inner tube 84 is moved forward so that the leading edge of inner tube 84 places wire 16 in alignment with the top of commutator slot 30. The first blade may then be used to complete the wire loop by driving wire 16 into commutator slot 30 on top of the previously inserted wire. The first blade reciprocates through opening 87 in inner tube 84 as shown in FIG. 27.

It will be apparent that the foregoing is merely illustrative of the principles of this invention, and that various modifications of this invention can be made by those skilled in the art without departing from the scope and spirit of the invention.

What is claimed is:

1. A method for winding wire around an electric motor armature, the armature having portions defining core slots and portions defining commutator slots, the method comprising the steps of:

winding the wire into first and second core slots with a rotating flyer;

positioning a guide ring having a notch so that the notch intersects and captures the wire;

positioning the armature so that the notch is aligned with a selected one of the commutator slots;

rotating the flyer in a first direction after the notch is positioned to intersect and capture the wire and after the notch is aligned with the selected commutator slot, the rotation of the flyer drawing the wire into the notch directly towards the selected commutator slot;

securing the wire in the selected commutator slot; and forming a loop in the wire.

2. The method defined in claim 1 wherein the step of securing the wire further comprises the steps of:

inserting the wire into the selected commutator slot by rotating the flyer in the first direction; and driving a peening tool into the selected commutator slot so as to deform a portion of the selected commutator slot edges on top of the wire, the deformed portion holding the wire in place.

3. The method defined in claim 2 wherein the step of forming the loop in the wire comprises the step of rotating the flyer in a second direction after securing the wire so that the wire is guided by the notch onto the top of the wire in the selected commutator slot.

4. The method defined in claim 3 further comprising the step of rotating the guide ring after forming the loop in the wire to cover the selected commutator slot, the rotated guide ring securing the wire.

5. The method defined in claim 4 further comprising the step of rotating the armature to further compact the loop of wire into the selected commutator slot.

6. The method defined in claim 2 further comprising the step of rotating the armature to further compact the loop of wire into the selected commutator slot.

7. The method defined in claim 1 wherein the step of securing the wire further comprises the steps of:
   rotating the flyer in the first direction so that the wire is disposed adjacent to the selected commutator slot; and
   driving the wire into the selected commutator slot with a first blade, the wire remaining in the selected commutator slot due to a tight fit between the wire and the selected commutator slot.

8. The method defined in claim 7 wherein the step of forming the loop in the wire comprises the step of rotating the flyer in a second direction after securing the wire so that the wire is guided by the notch into alignment with the commutator slot.

9. The method defined in claim 8 further comprising the step of rotating the guide ring after forming the loop in the wire to cover the selected commutator slot, the rotated guide ring securing the wire.

10. The method defined in claim 9 further comprising the step of rotating the armature to further compact the loop of wire into the selected commutator slot.

11. The method defined in claim 1 further comprising the step of rotating the armature to align a third core slot for wire insertion by the flyer.

12. The method defined in claim 11 further comprising the steps of:
   aligning the third core slot for wire insertion so that the third core slot intersects the wire path;
   inserting the wire into the third core slot with the flyer;
   rotating the armature so that the third core slot and a fourth core slot are aligned for winding; and
   winding the wire into the third and fourth core slots with the flyer.

13. A method for winding wire around an electric motor armature, the armature having portions defining core slots and portions defining commutator slots, the method comprising the steps of;
   winding the wire into first and second core slots with a rotating flyer;
   aligning the wire for insertion into one of the commutator slots, wherein the step of aligning the wire for insertion into one of the commutator slots comprises the steps of:
      rotating a guide ring having portions that define a notch into alignment with the commutator slot, the notch intersecting the path of the wire, and
      rotating the flyer in a first direction so that the wire is guided by the notch toward the commutator slot;
   securing the wire in the commutator slot, wherein the step of securing the wire further comprises the steps of:
      rotating the flyer in the first direction so that the wire is disposed adjacent to the commutator slot, and
      driving the wire into the commutator slot with a first blade, the wire remaining in the commutator slot due to a tight fit between the wire and the commutator slot;
   forming a loop in the wire, wherein the step of forming the loop in the wire comprises the step of rotating the flyer in a second direction after securing the wire so that the wire is guided by the notch into alignment with the commutator slot;
   rotating the armature so that the commutator slot is aligned with a second blade and the wire is further aligned with the commutator slot; and
   driving the wire with the second blade into the commutator slot on top of the wire in that commutator slot.

14. The method defined in claim 13 further comprising the step of rotating the guide ring after driving the wire into the commutator slot with the second blade to cover the commutator slot, the rotated guide ring further securing the wire.

* * * * *